(12) United States Patent
Ziegler

(10) Patent No.: US 10,384,881 B2
(45) Date of Patent: Aug. 20, 2019

(54) METHOD AND APPARATUS FOR DETERMINING A SPECIFIC ENERGY CONSUMPTION OF BELT CONVEYORS

(71) Applicant: VOITH PATENT GMBH, Heidenheim (DE)

(72) Inventor: Manfred Ziegler, Erftstadt (DE)

(73) Assignee: Voith Patent GmbH, Heidenheim (DE)

(*) Notice: Subject to any disclaimer, the term of this patent is extended or adjusted under 35 U.S.C. 154(b) by 0 days.

(21) Appl. No.: 15/741,413

(22) PCT Filed: Jun. 16, 2016

(86) PCT No.: PCT/EP2016/063846
§ 371 (c)(1),
(2) Date: Jan. 2, 2018

(87) PCT Pub. No.: WO2017/001203
PCT Pub. Date: Jan. 5, 2017

(65) Prior Publication Data
US 2018/0370734 A1 Dec. 27, 2018

(30) Foreign Application Priority Data

Jul. 1, 2015 (DE) .................. 10 2015 212 267

(51) Int. Cl.
*B65G 43/08* (2006.01)
*G01G 11/00* (2006.01)

(52) U.S. Cl.
CPC .......... *B65G 43/08* (2013.01); *G01G 11/003* (2013.01); *B65G 2203/0258* (2013.01); *B65G 2203/0291* (2013.01); *B65G 2203/043* (2013.01)

(58) Field of Classification Search
CPC ........ B65G 43/00; B65G 15/08; B65G 43/02; B65G 43/08; G01G 11/00
(Continued)

(56) References Cited

U.S. PATENT DOCUMENTS 5,133,448 A * 7/1992 Van Niekerk .......... B65G 43/02
198/502.1
5,168,266 A * 12/1992 Fukuda .................. B65G 43/02
198/810.02
(Continued)

FOREIGN PATENT DOCUMENTS

AU  2007343372 A1  7/2008
DE  19921224 A1  11/2000
(Continued)

OTHER PUBLICATIONS

Hintz, Andreas; "Einfluß des Gurtaufbaus auf den Energieverbrauch von Gurtförderanlagen", [Influence of the belt structure on the energy consumption of belt conveying installations] Dissertation at the University of Hanover 1993; English Abstract.
Geesmann, Franz-Otto; "Experimentelle und theoretische Untersuchungen der Bewegungswiderstände von Gurtförderanlagen" [Experimental and theoretical studies of the resistances to movement of belt conveying installations], Dissertation at the University of Hanover 2001; English Abstract.
(Continued)

*Primary Examiner* — James R Bidwell
(74) *Attorney, Agent, or Firm* — Laurence A. Greenberg; Werner H. Stemer; Ralph E. Locher

(57) ABSTRACT

A belt conveyor and a method for determining an energy consumption of a belt conveyor on a basis of conveyor belt segments or on a basis of installation sections of the belt conveyor. The belt conveyor has at least one drive for driving a conveyor belt formed of conveyor belt segments. The belt conveyor has a control device, which is fed signals of a first sensor system for sensing the energy consumption of the drive and of a second sensor system for sensing a loading that can be assigned to a section of the conveyor belt and of a third sensor system for detecting connecting sections between conveyor belt segments. The control device determines an energy consumption on the basis of installation sections and/or conveyor belt segments.

16 Claims, 1 Drawing Sheet

(58) Field of Classification Search
USPC .................................................. 198/810.02
See application file for complete search history.

(56) References Cited

U.S. PATENT DOCUMENTS

| | | | | |
|---|---|---|---|---|
| 6,015,038 A * | 1/2000 | Stoxen | ................... | B66B 23/24 |
| | | | | 198/322 |
| 7,779,994 B1 * | 8/2010 | Travis | ................... | B65G 43/02 |
| | | | | 198/810.01 |
| 2014/0326582 A1 * | 11/2014 | Sakaguchi | ............. | B65G 43/02 |
| | | | | 198/810.02 |

FOREIGN PATENT DOCUMENTS

| | | |
|---|---|---|
| DE | 102007002015 A1 | 7/2008 |
| WO | 2008083809 A1 | 7/2008 |

OTHER PUBLICATIONS

Ziegler, Manfred; "Energetische Optimierung von Fördergurten bei der RWE Power AG" [Optimizing the energy of conveyor belts at RWE Power AG], World of Mining—Surface & Underground 61; Jun. 2009; pp. 363-372.

Wennekamp, Tobias; "Tribologische und rheologische Eigenschaften von Fördergurten" [Tribological and rheological properties of conveyor belts], Dissertation at the University of Hanover 2008; English Abstract.

* cited by examiner

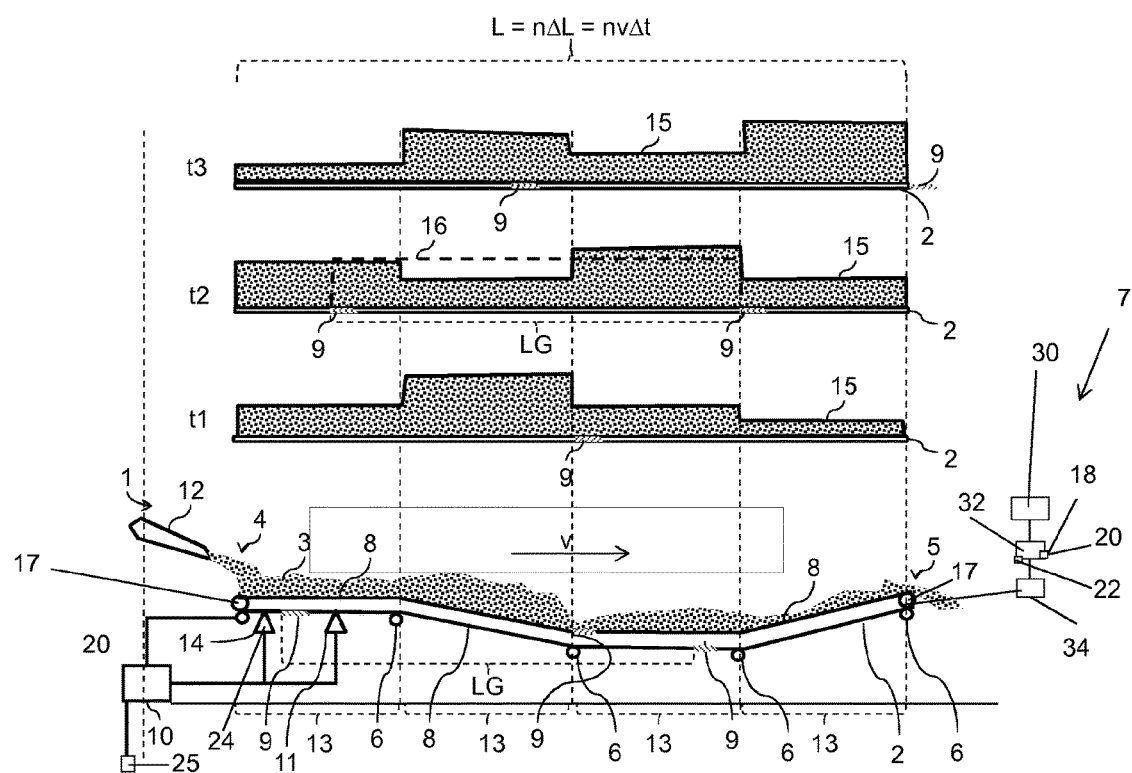

METHOD AND APPARATUS FOR DETERMINING A SPECIFIC ENERGY CONSUMPTION OF BELT CONVEYORS

BACKGROUND OF THE INVENTION

Field of the Invention:

The invention relates to a method and an apparatus for determining an energy consumption or resistance of belt conveyors.

When operating conveyors, the energy consumption is the greatest cost factor. It is therefore of great interest to keep this energy consumption low. Individual belt conveyors differ, sometimes considerably, with regard to the specific energy consumption for transporting material. Apart from influences of the structural design, such as the troughing angle, carrying roller spacing and carrying roller diameter etc., which can subsequently only be changed with great effort, the belts used and the maintenance condition of the installation have the greatest influence on a resistance to horizontal movement of a belt conveying installation, and consequently on the influenceable energy consumption.

Belts of different manufacturers and/or different rubber compounds produce different resistances to movement that are sometimes very different, as explained in Hintz, A.: "Einfluß des Gurtaufbaus auf den Energieverbrauch von Gurtförderanlagen", [Influence of the belt structure on the energy consumption of belt conveying installations] Dissertation at the University of Hanover 1993, [1] Geesmann, F. O.: "Experimentelle und theoretische Untersuchungen der Bewegungswiderstände von Gurtförderanlagen" [Experimental and theoretical studies of the resistances to movement of belt conveying installations], Dissertation at the University of Hanover 2001, and Ziegler, M.: "Energetische Optimierung von Fördergurten bei der RWE Power AG" [Optimizing the energy of conveyor belts at RWE Power AG], World of Mining 6/2009. The operators of belt conveying installations therefore have a great interest in using belts that are particularly favorable in this respect. There has so far been a lack of a generally recognized method of assessing the belts in this respect, and thereby providing the user with an important selection criterion. It is especially not possible with acceptable effort to determine generally the resistance to movement of the belts while they are in operation. In this respect, there are two measuring rigs in belt conveying installations in opencast mines of RWE Power AG that are based on the work of [1] and measure resistance to movement for the belts used as a function of the applied load.

There is a test rig for determining an indentation rolling resistance of conveyor belts according to DIN 22123 at the Institute of Transport and Automation Technology of the University of Hanover. The climatically controlled test rig provides a measure of the resistance to movement of the measured belt with a specific applied load, velocity, carrying roller diameter and ambient temperature. Series of measurements on different belts and their mathematical replication can in this case be measured or replicated by using an exponential approach $F'_G = a * F'_O{}^b$. When comparing, however, the determinable indentation rolling resistance correlates only poorly with the operational measurements according to [1]. For instance, a belt quality in the operational test was much poorer than another belt quality, which had a greater running resistance under the same applied load in the test rig measurement. The cause of this is the deformation of the contact zone occurring with this type of measurement, which differs significantly from a load occurring during operation. In the measurement, a drum is used as an abutment for the measuring carrying roller, whereby the rubber of the running sheet cannot deform upwardly and the properties of the core rubber and of the outer sheet are disregarded. The classification of a belt in accordance with DIN 22123 therefore only provides the user with a poor reference point for the energy consumption to be expected when using this belt in comparison with another. What is more, the user has no possibility of operationally verifying claims in this respect that are made by its belt supplier—unless it has a correspondingly sophisticated measuring apparatus in accordance with [1].

WO 2008/083809 A1 [2] describes a method for determining the specific overall energy consumption of an operating belt conveying installation for bulk material under non-constant loading and provides an individual quality factor for the overall installation. By correlation of the loading distribution with the profile of a belt installation, its specific resistance to movement during operation can be measured, whereby gradual changes—for instance because of deterioration of the state of alignment—can be detected and countermeasures initiated. With this method, the energy efficiency of a belt installation can be specified quite generally in comparison with an earlier time or with other belt installations. However, influences that contribute to the efficiency measured at a particular time are not separately sensed and indicated. In particular, it is consequently neither possible to assess the quality of the belts used with regard to their specific resistance to movement and compare the individual belts with one another, nor to give the operator specific suggestions of which installation sections make a particularly great contribution to the energy consumption and require improvement as a matter of preference, for example of their state of alignment.

The alignment of individual carrying roller stations has a particular influence on the actual energy consumption from various aspects of the maintenance condition of a belt conveying installation. If this is found to be too great, for example by a monitoring of efficiency, an inspection by qualified expert personnel is required in order to find and eliminate alignment errors.

SUMMARY OF THE INVENTION

The invention is therefore based on the object of providing a method and an apparatus that presents individual influences, such as the contribution of the individual belts and/or belt sections. In this case, a belt conveyor or a belt conveying installation comprises a conveyor belt. The conveyor belt consists of individual conveyor belt segments. These individual conveyor belt segments may differ in their properties. The conveying path of the belt conveying installation can also be divided into individual installation sections. In particular, the invention is based on the object of providing an apparatus and a method to identify during operation conveyor belt segments that cause a low energy consumption and/or installation sections that have a high energy consumption.

The object of the invention is also in particular to provide a method and an apparatus whereby a display of installation sections that are particularly in need of maintenance is possible.

The solution according to the invention is characterized by the features of the independent apparatus claim and the independent method claim. Advantageous refinements are given in the subclaims.

Further aspects that are set out in the description may represent independent inventive details.

The belt conveyor according to the invention has at least one control device and at least one drive for driving a conveyor belt. The conveyor belt consists of conveyor belt segments. A conveyor belt is formed by the conveyor belt segments, the conveyor belt segments being connected to one another by means of connecting sections. For mounting the conveyor belt, at least one carrying roller is provided. For sensing the energy consumption of the at least one drive, a first sensor system is provided. A second sensor system is also provided, for sensing a loading that can be assigned to a section of the conveyor belt. The connecting sections between the conveyor belt segments are detected by a third sensor system. The signals of the sensor systems are fed to the control device.

Instead of the one drive, a number of drives may be provided. The drives are provided with in each case a first sensor belonging to the first sensor system, which detects the energy consumption of the respective drive. These signals of the first sensors are passed on to the control device.

It is possible by the sensor system provided to compare a calculated energy consumption, which is referred to hereinafter as the power demand, with an actual measured energy consumption while taking into consideration a loading and loading distribution. By taking into consideration the conveyor belt segments or on the basis of the installation sections and applying mathematical methods, it is possible to bring the calculated power demand into agreement with the actually measured energy consumption. It is also possible to bring into agreement not only the energy consumption with the power demand on the basis of the conveyor belt segments but also the power demand and the measured energy consumption on the basis of installation sections.

On the one hand, it can be determined during operation from a deviation on the basis of the individual conveyor belt segments which types or which conveyor belt segment used in the installation are particularly suitable and cause a low energy consumption and which conveyor belt segments cause a high energy consumption.

The determination of which installation sections have a particularly high energy consumption in comparison with a calculated power demand allows installation sections that are in need of maintenance to be determined during operation.

In an advantageous embodiment, it is provided that the third sensor system comprises at least one sensor for sensing the compressive spring stiffness of the conveyor belt. By detecting the compressive spring stiffness, connecting sections between two conveyor belt segments can be detected. The connecting sections have an increased compressive spring stiffness, and so, when an increased compressive spring stiffness is detected, a connecting section can be inferred.

The control device may be of a multi-part or single-part form. If the control device is of a multi-part form, the constituent parts of the control device are in signaling connection with one another. The constituent parts may also be referred to as control modules.

It has been found to be advantageous that the third sensor system is arranged with respect to the belt conveyor. Taking into consideration the velocity of the conveyor belt, the position of the individual conveyor belt segments can be tracked over time.

A fourth sensor system may be provided for sensing the velocity of the conveyor belt.

Advantageously, information characterizing the belt conveyor device, such as in particular the overall length of the conveyor belt and/or the length of the upper strand, is stored in the control device.

In a preferred embodiment of a belt conveyor, a steel cable conveyor belt is provided as the conveyor belt. It has been found to be advantageous to provide a coil or at least one magnetic field sensor as the third sensor system. The coil or the magnetic field sensor can be used to detect an accumulation of steel. An accumulation of steel is an indication of a connecting section.

In a preferred embodiment, a torque sensor is provided together with a speed sensor for sensing the actual energy consumption. The torque sensor and the speed sensor are arranged in the drivetrain. Instead of the rotational speed, a velocity signal is used. If the rotational speed is constant or the velocity is constant, it is possible to dispense with the sensing of velocity or rotational speed.

In a particularly preferred embodiment, the torque sensor and the speed sensor are provided in a hydrodynamic clutch arranged in the drivetrain, in particular on the output side.

The method according to the invention for sensing the energy demand of a belt conveyor with at least one drive and a conveyor belt consisting of conveyor belt segments is distinguished by the following method steps:

sensing the loading distribution of the conveyor belt
calculating the energy demand of the drive while taking into consideration the loading distribution of the conveyor belt
sensing the energy consumption of the at least one drive
applying a correlation function to the calculated energy demand to bring about an agreement of the calculated energy demand with the measured energy consumption.

In a preferred embodiment, it is envisaged when applying the correlation function to provide a subdivision on the basis of the individual conveyor belt segments located in the upper strand. This makes it possible to identify particularly suitable conveyor belt sections during operation, these conveyor belt sections being distinguished by a low energy consumption. When such conveyor belt segments are used exclusively, the energy consumption of the belt conveyor can be reduced.

The length of the installation is known in particular, and the length of the conveyor belt of the belt conveying installation is known. It is consequently possible to identify individual conveyor belt segments by the sequence of connecting sections. Generally, the conveyor belt segments also differ in their length, so that already on this basis alone individual conveyor belt segments can be clearly identified by means of this sensor system.

It may be envisaged when starting or first running a belt conveyor initially just to identify the conveyor belt segments, and to carry out the method steps of the previously described method on identified conveyor belt segments.

It has also been found to be advantageous when applying the correlation function to provide a subdivision into installation sections. This makes it possible to identify installation sections that have a much higher energy consumption than the calculated energy demand of the section. For the identification of a greater energy consumption, it is required that the energy consumption of the installation section exceeds a predetermined amount over a predetermined frequent number of times. This is an indication of an installation section in need of maintenance.

In a preferred embodiment, it is provided that an installation section in need of maintenance must be detected over a predetermined time before a notification of an installation section that is in need of maintenance is given. This makes it possible to avoid notification of a section that is in need of maintenance occurring immediately as a result of individual false measurements.

In may be envisaged to carry out a first optimization by means of the correlation function on the basis of the conveyor belt segments and a further optimization by means of a correlation function on the basis of the installation sections. In a preferred embodiment, it is envisaged to carry out these two optimizations in parallel.

In an advantageous embodiment, a memory which is assigned to the control device and in which the variations over time of installation sections in need of maintenance are stored is provided. Furthermore, a quality assigned to the individual conveyor belt segments with respect to the energy consumption may be stored in a comparable form in this memory or in a further memory assigned to the control device. The change over time of the energy consumption, for example due to aging, can thereby be determined during operation.

In a preferred embodiment, it is provided that, for determining a variation over time of the position of a conveyor belt segment, connecting sections at least of the conveyor belt segment to at least one neighboring conveyor belt segment are sensed.

In a preferred embodiment, it is envisaged to measure a compressive spring stiffness of the conveyor belt. The signals are passed on to the control device. Passing of the sensor system for measuring the compressive spring stiffness of a connecting section between conveyor belt segments is detected from a transient increase in the measured compressive spring stiffness.

It has been found to be advantageous in the case of a conveyor belt with steel cables to measure a coil current or a magnetic field and to feed the signals to the control device. The connecting sections are determined from the time sequence of the signals.

In a preferred embodiment, it is envisaged to carry out a torque measurement and a speed measurement in the drivetrain for the determination of the energy consumption.

Most preferably, signals of a torque sensor and a speed sensor arranged in a hydrodynamic clutch arranged in the drivetrain are used for the determination of the energy consumption.

In a preferred embodiment, it is envisaged to determine a width-based resistance to movement ($F'_G$) of a conveyor belt segment by means of an optimization method. In particular, the following approach $$F'_G = a \cdot F'_O{}^b$$

with $F'_O$ as the width-based applied load perpendicular to a carrying roller, a coefficient a and an exponent b as parameters, has been found to be suitable. The coefficients a and b depend here on the belt properties of the conveyor belt segment.

Consequently the width-based resistance to movement is advantageously determinable as a flexing power loss in the contact zone of the belt with the carrying rollers, the resistance movement increasing with increasing load applied by the material being conveyed. The coefficient a and the exponent b are unknown a priori or preassigned, for example have standard values assigned, and are approximated by means of the optimization method.

In a preferred embodiment, the belt conveying installation is provided with a temperature sensor. The measured values sensed at the same time are assigned to a temperature class. A plurality of temperature classes are provided. The determination or evaluation is only carried out within one temperature class. As a result, fluctuations as a result of different temperatures are eliminated.

The previously described apparatus and the method allows specific influences on the energy consumption of belt conveyors and their individual constituent parts to be determined by the previously described measures. This makes it possible to carry out corrections or improvements specifically for individual installation sections.

The installation section is a section of a belt conveyor in the transporting direction, the installation section comprising the belt-carrying components of the belt conveyor. The length of the installation sections is freely selectable.

Preferably, installation sections are divided in dependence on the run, in particular the slope and the direction of alignment.

An installation section may at least partially comprise various conveyor belt segments.

The energy consumption is the overall power for driving the circulating belt by means of one or possibly also more than one drive or motor.

The optimization method, referred to as the correlation function, is for example a minimizing of the sum of all error squares of the n measured values by means of a gradient method. The gradient method is known for example from Andreas Meister: Numerik linearer Gleichungssysteme [Numerics of linear systems of equations], 2nd edition, Vieweg, Wiesbaden 2005, ISBN 3-528-13135-7. The optimization method is carried out to approximate the calculated energy demand to the measured energy consumption.

The determination of the reference quality factor from the variables thus approximated is performed for a fixed reference mass flow or a nominal conveying power, in particular according to DIN 22101. Determined in particular is the reference quality factor value, or so-called f value, with which the DIN formula produces the same power demand for the overall calculation method for the nominal conveying power as the method for calculating the individual components of the power demand with the optimized variables. Power demand refers to a theoretically determined energy consumption.

The provision of the determined assigned energy consumption or reference quality factor (f) values is in this case performed for example by a presentation, in particular by a presentation, that can be viewed by operating or evaluating personnel or can be further processed or can be stored, for example in a digital form.

BRIEF DESCRIPTION OF THE DRAWING

The solution according to the invention is explained below on the basis of a FIGURE, in which specifically:

The sole FIGURE shows in a schematized and simplified representation the basic structure of a belt conveyor and a loading distribution changing over time.

DESCRIPTION OF THE INVENTION

A belt conveyor 1, also referred to as a belt conveying installation, has a circulating conveyor belt 2, which is generally also referred to as a belt. On the belt 2, a material being conveyed 3, in particular bulk material, is transported from a feeding region 4 to a discharging or transferring region 5. The conveyor belt 2 is deflected by deflecting rollers 17, often also referred to as deflecting drums or drums, upstream of the feeding region 4 and in the area of the discharging region 5. The conveyor belt 2 is guided by means of carrying roller 6 in the upper and lower strand and is deflected by drums 17, one or more drums 17 having a drive 7, for example an electric motor, in order to set the conveyor belt in motion. For transporting the bulk material, usually the upper section of the belt conveying installation is used. This is referred to as the upper strand. The non-loaded lower part, in which the conveyor belt is returned, is referred to as the lower strand. The carrying rollers arranged in the upper strand and in the lower strand may be configured differently.

The belt 2 consists of a multiplicity of conveyor belt segments 8. The conveyor belt segments 8 are connected to one another by way of connecting sections 9 and together form the circulating conveyor belt 2. In FIG. 1, the conveyor belt 2 is sketched by way of example as consisting of three conveyor belt segments 8. One of these conveyor belt segments has by way of example a conveyor belt segment length LG. Each of the conveyor belt segments may have an individual belt length that differs from the other conveyor belt segments 8.

A control device 10 serves for operating some or all of the functions of the belt conveyor 1. The control device 10 may also be of a multi-part configuration.

For example, the control device 10 may control the movement, in particular velocity v, of the conveyor belt 2 by way of the drive 7. It may also be provided that the conveyor belt 2 is driven by a plurality of drives 7. The signals characterizing the energy consumption of the drive 7 are fed to the control device 10. The signals characterizing the energy consumption are sensed by a first sensor system 18.

The drive 7 may have a motor, which is connected by way of a hydrodynamic clutch 32 to a gear mechanism 34. The output shaft of the gear mechanism 34 is connected to a drivable deflection roller 17. It may be envisaged to pass to the control device 10 the torque-characterizing signals and similarly also the speed-characterizing signals emitted by the hydrodynamic clutch 32 for a determination of the energy consumption. The characterizing signals are obtained by a speed sensor 22 arranged in the hydrodynamic clutch 32 and a torque sensor 20 arranged in the hydrodynamic clutch 32. From these sensors 20, 22, the signals are passed to the control device 10.

It is also provided that signals of a third sensor system 11 are fed to the control device 10. The signals of the third sensor system 11 make it possible to sense connecting sections 9 of two conveyor belt segments, also referred to as individual belts. The third sensor system 11 is fixedly arranged in the belt conveying installation 1. If a connecting section 9 is detected, the position of the connecting section 9 is at the same time also known. The momentary velocity of the conveyor belt 2 and the computing time for detecting a connecting section 9 may also be taken into consideration here.

When using steel cable conveyor belts, a coil or a magnetic field sensor may be used as the third sensor system 11 for detecting connecting sections 9. During operation, the periodicity of the detected connecting sections 9 can be used for determining the length and the sequence of conveying belt segments 8. Generally, the overall length of the conveyor belt 2 is also additionally known.

When using fabric conveyor belts or steel cable conveyor belts, a sensor system for sensing the compressive spring stiffness of the conveyor belt 2 may be provided as the third sensor system 11.

By way of example, a chute 12 is sketched. The chute is used for bringing the material being conveyed 3 onto the belt 2. For example in the area underneath the chute 12, a belt weigher 14 is arranged as an embodiment of a second sensor system 24. The belt weigher 14 senses an applied load, i.e. a weight of the material being conveyed 3 that is applied to the belt 2, and passes on a corresponding weight value as a measured value to the control device 10.

By way of example, the belt conveyor 1 is subdivided over a loading length L of the circulating belt 2 into n, by way of example n=four, installation sections 13 or momentary belt sections of the belt conveying installation. The control device 10 is designed for these installation sections 13 and/or the belt conveyor segments 8. By means of the available values, in particular the applied load and the power consumption, the preferred method for determining an energy consumption, the energy demand, is carried out.

In particular, this involves determining a reference quality factor f, which may correspond to a section resistance as an overall resistance in the belt conveyor as a quality factor.

At the top of the figure, an average applied load on the installation sections 13 is sketched for three different points in time t1, t2, t3, following one another during the conveying, that has been determined for these times by means of the control device 10. Used for the calculation is a loading length $\Delta L$, over which the applied amount conveyed is sensed by the belt weigher 14 during a time interval $\Delta t$.

One method step relates to a sensing of the individual conveyor belt segments 8. This may be carried out for example on the basis of the method according to WO 2008/083809 A1. However, in addition to taking into consideration the loading distribution, the sequence of the individual conveyor belt segments 8 is sensed.

In the case of the method described here, the sequence of the conveyor belt segments used is sensed in addition to taking into consideration the loading distribution. This may be performed for example by the torque being measured in the drivetrain with a sufficiently high sampling rate and accuracy at one or more drive drums 7:

The torque corresponds to the circumferential force (=running-up force minus running-down force) multiplied by the effective radius. The effective radius is the distance between the axis of rotation of the drum and the neutral fiber in the belt. In the area of the connecting sections 9, the position of the neutral fiber deviates slightly from that in the undisturbed conveyor belt segment 8 outside the connection—even if the belt thickness is constant. One reason for this is that more tension members (steel cables or fabrics) are concentrated in a connection and, as a result, the compressive spring stiffness of the belt changes in the area of the connection. On the other hand, the connections are produced manually and their properties are consequently subject to the skilled craftsmanship of the vulcanizers, and consequently to a greater tolerance than the rest of the industrially manufactured belt. The effective radius therefore changes slightly when a connecting section runs through. In the case of a drive drum of 1000 mm in diameter (=500 mm radius), a change in length of the neutral fiber of 0.5 mm leads to a torque fluctuation of 0.1%. This torque fluctuation builds up and disappears again within the running-through time of a connecting section 9.

This running-through time tconn is calculated as follows:

$$t_{conn} = (l_{U,drum} + l_{conn})/v_{belt},$$

where
$l_{U,drum} \approx r \cdot \alpha$
$l_{conn}$: length of connection
$v_{belt}$: belt velocity
$l_{U,drum}$: wraparound arc of the drum r: drum radius α: wraparound angle in rad Computing example: nominal belt strength St 2500, two-stage connecting section with lconn 1 m, drum diameter 1000 mm, wraparound angle 180°, belt velocity 4 m/s:

$t_{conn}=(\pi \cdot 0.5+1)/4=0.64$ s

Each connecting section 9 will generate a slightly different torque signal, but all of these torque signals are of a similar length. The time between them corresponds to the length of the individual conveyor belt segments 8, which is generally known or else can be calculated from the detected torque signals, which are repeated after every revolution. Since the continuous belt of a belt conveying installation consists of individual belt pieces, which are generally not of the same length, the exact position of each individual conveyor belt segment 8 can be determined from the time sequence of the detected connecting sections 9 at each point in time.

In the case of steel cable belts, the detection of connecting sections 9 can alternatively also be performed by a coil or a magnetic field sensor being fixedly mounted just under a running sheet of the belt 2. In the case of steel cable belts, the type of connection produces an accumulation of steel at the connection, which can be detected well by a sensor.

The use of a torque sensor in the drivetrain has the additional advantage that the actual energy consumption of the belt conveyor 1 can be sensed very much more accurately than with an electrical wattmeter in the power supply of the motor 30. This increased accuracy is beneficial to the quality of the method described here.

A further method step relates to a synchronization of the loading profile and the profile of the installation.

The profile of the belt conveyor 1, which possibly takes into consideration longitudinal and vertical coordinates along the belt conveyor 1, is for example synchronized with the signal of the belt weigher 14 or the signals of the second sensor system 24. For this purpose, for each time interval Δt, an amount conveyed mi belonging to this time interval Δt is sensed by the belt weigher 14 and—in a way corresponding to a running time between the belt weigher 14 and the feeding point—is assigned with an appropriate time delay to a belt section or installation section 13 of the belt conveyor 1 of the length ΔL=Δt·v, where v corresponds to the velocity of the belt 2. If the belt runs over the drive drum 7 without slipping, the rotational speed of the drive drum 7 the velocity of the belt is also known. At the same time, this loading is assigned to a segment, also referred to as the loading length ΔL, of the belt 2, that is at the time passing the feeding region 4. This loading length ΔL may be of the same length in each case or have a varying length. When using varying lengths, the loading lengths may be adapted to the overall length LG of the conveyor belt segment 8; preferably, a conveyor belt segment 8 is subdivided into loading lengths of the same length. The loading distribution along the belt conveyor 1, and also the position of the loading length of the conveyor belt segments 8 from the previous time interval Δt, are correspondingly advanced by the loading length ΔL, while losing the forwardmost loading package.

Thus, the individual installation sections 13 can be respectively assigned a momentary loading distribution 15 and correspondingly the conveyor belt segments 8 can be respectively assigned a momentary loading distribution 16. For the loading distribution 16 of the conveyor belt segments 8, the signal of the connecting section sensor 11 is additionally used. Computationally determined mean values of the load applied by the material being conveyed 3 located on them are determined in particular as loading distributions 15, 16.

A further method step relates to a calculation of the individual components of the power demand.

In this case, the power demand at the particular time is calculated for each time interval for every j of the n segments. This involves taking into consideration the following individual components, a lifting power, a flexing power loss in the contact zone of the belt 2 with the carrying rollers 6, a flexing power loss in the material being conveyed 3 and optionally a power loss from a carrying roller running resistance, an accelerating power, the latter in particular only for a segment with a transfer, and a chute frictional power, the latter in particular only for segments with a longitudinal chute.

The lifting power is obtained from the physical work per unit of time to raise the conveyed material to a higher level, that is to say a power demand, or to lower it to a lower level, it is to say a power feedback. It is independent of the condition of the installation, the belts used etc.

The flexing power loss in the contact zone of the belt with the carrying rollers is required for the horizontal transport of material and depends on the state of alignment of the installation and the damping properties of the belt 2 used. The distribution of the applied load on the carrying rollers 6 can be calculated from the density of the material being conveyed 3 and the loading at the particular time. A width-based resistance to movement $F'_G$ of a belt 2 in contact with a carrying roller 6 can in particular be replicated very well by the mathematical function $F'_G = a \cdot F'_O{}^b$, where $F'_O$ is a width-based applied load perpendicular to the carrying roller 6. The coefficient a and the exponent b are parameters that depend on the belt properties and possible alignment errors and are not known a priori, or do not have to be known, and are approximated by a suitable optimization method. For the calculation of this power loss, the belt 2 may for example be divided into m strips, the resistance to movement being calculated for each strip, in particular by means of $F'_G$ times the strip width, and multiplied by the belt velocity v. The results of all the strips are added together and extrapolated to obtain the overall length of the strip section under consideration, for example the loading length ΔL. A simplified version of such a procedure is described in Wennekamp, T.: "Tribologische and rheologische Eigenschaften von Fördergurten" [Tribological and rheological properties of conveyor belts], Dissertation at the University of Hanover 2008.

The flexing power loss in the material being conveyed 3 is produced by frictional losses within the material being conveyed 3, which are inversely proportional to the square of a local belt tension and are independent of the belt 2 or conveyor belt segment 8 used. The belt tension along the belt conveyor 1 can be calculated very accurately from the loading distribution at the particular time and drive power, if it is available as a measuring result at a location.

The power loss from carrying roller running resistance depends on the running resistance of a carrying roller 6 and is dependent on the type of construction and, for the range of loading that occurs in practice, is virtually independent of the applied load. The carrying roller running resistance can be inquired from the manufacturer or alternatively be calculated as part of the idling power, by subtracting from the latter the flexing power loss of the empty belt.

The accelerating power is obtained as the product of the mass flow in the area of the transferring or feeding region 4 times the square of the differential velocity between the material being conveyed 3 and the belt 2 and corresponds for example with vertical feeding to $v^2$. Especially in the case of belt conveyors 1 with a relatively high velocity, correctly taking into consideration the accelerating loss at the particular time leads to a considerable gain in accuracy in the determination of the energy efficiency at the particular time of the belt conveyor 1.

The chute frictional loss is relevant in the feeding region of the material being conveyed and along a trough exiting path, where longitudinal chutes are used upstream of the discharge drum in order to prevent the material being conveyed 3 from falling off the sides. These chutes are usually designed in such a way that they are not in contact with the belt 2. They only come into contact with the material being conveyed 3 from a certain height of the conveyed stream. Below this limit loading, the frictional power produced by chutes is therefore zero; above it, it increases with good approximation proportionately to the conveyed stream. It accounts for a low proportion of the overall power demand, but correctly taking it into consideration is likewise advantageous for the exact determination of the energy efficiency.

The sum of all the power components of all the segments n gives an overall power demand, which over a sufficiently long time period is compared with the active power at a particular time or the energy consumption of the drive 7. Variables that are preferably taken into consideration in the calculation of the theoretical power demand—the global belt parameters a, b for the running side in contact with the carrying rollers 6 in the upper strand and a', b' for the carrying side in contact with the carrying rollers 6 in the lower strand, the carrying roller running resistance and the limit loadings from which chute friction occurs at the front and rear, and also the frictional values for taking this chute friction into consideration—are varied by an optimization method until a deviation between the calculated power demand and the measured active power or energy consumption in the time period under consideration becomes minimal.

A further method step relates to taking into consideration a temperature influence on the belt 2 and possibly also further movable and frictional components during operation.

Since the belt temperature of the belt 2 has a considerable influence on the belt properties, it is preferably likewise taken into consideration. The belt temperature is obtained from an ambient temperature and heat that has been introduced into the belt 2 by the flexing of the rubber. After being at a standstill for a relatively long time, the belt 2 has assumed the ambient temperature and, after it begins running again, slowly becomes warmer, whereby the resistance to movement as a result of rubber flexing decreases, until a steady state is reached. Correspondingly, preferably only those measured values for which the ambient temperature was constant for a sufficiently long time and changes of the calculated specific resistance to movement have fallen below a corresponding threshold are taken into consideration. The measured values are provided, in particular stored, in a temperature class applicable to them of the corresponding ambient temperature. An evaluation is then performed for each temperature class. The temperature influence usually acts equally for all conveyor belt segments 8. An assessment of the various conveyor belt segments 8 with regard to energy consumption can be performed for different temperature classes. The absolute values of the specific resistance to movement of the conveyor belt segments 8 may differ considerably between a low temperature class and a high temperature class.

A further method step relates to taking into consideration the specific apparent density.

For the most accurate possible calculation of the flexing power loss in the contact zone of the belt 2 with the carrying rollers 6, the specific apparent density of the material being conveyed 3 is used. If it can change as a result of operating conditions of the belt conveyor 1, then along with the sensing of the mass flow by means of the belt weigher 14 the volumetric flow is also measured, for example by means of laser light section methods, and taken into consideration.

A further method step relates to an actual performance of the calculation.

The following calculation steps are carried out for a sequence of n measured values of the drive power at a particular time and the loading at a particular time, in particular the total mass with an average apparent density for a loading length $\Delta L$:

a. Calculation of the individual components, in particular described above, while taking as a basis previously estimated or previously stipulated values for the variables in the calculation of the theoretical drive power, i.e. in particular the global belt parameters a, b etc., and comparison with the associated n measured values of the determined drive power.

b. Variation of the variables by means of suitable optimization methods, for example minimizing the sum of all error squares of the n measured values by means of a gradient method for approximating to the measured power demand over this interval of the n measured values.

c. With the variables thus found, a reference quality factor f is determined, in particular according to DIN 22101, for a fixed reference mass flow, or nominal conveying power. Determined in particular is the so-called f value, with which the DIN formula produces the same power demand for the overall calculation method for the nominal conveying power as the method described above with the optimized variables.

d. This is optionally followed by a decision concerning a validity of the measured values: if the ambient temperature has not changed over a sufficient number of measured values, these measured values are used to form a moving average of the reference quality factor. If its gradient is less than a predetermined threshold, the measured values are valid.

e. For each valid measured value, the conveyor belt segments 8 are sorted according to their loading 16, and similarly the installation sections 13 of the conveyor belt 1 are sorted according to their loading of the installation section 15.

f. Storing of these two sorting sequences with associated f value and optionally also the temperature class at the particular time.

A further method step relates to an actual evaluation. The following steps can be carried out here even without taking temperature classes into consideration if for example no critical temperature fluctuations occur during operation.

For each conveyor belt section 8, all the f values when this individual belt 8 respectively assumed the uppermost place and the lowermost place in the sorting sequence are presented for each valid temperature class, i.e. for each temperature class consideration is only given to measured values for which the belt installation has already been operated in this temperature class for longer than the time required to achieve the steady-state temperature in the belt 2. The idea behind this is as follows: if a belt has a low resistance to movement, the f values from the loading situations in which it had a high proportion (=uppermost place in the sorting sequence) should be lower than those when it was only loaded little (=lowermost place of the sorting sequence).

Furthermore, for each conveyor belt segment 8, the mean values of the f values are determined respectively for the uppermost place and lowermost place of the individual belt 8 in the sorting series for this temperature class.

For each temperature class, the individual belts 8 are sorted in accordance with these mean values.

Since a belt 2 or conveyor belt section 8 with good energy characteristics has all the greater benefit for the overall resistance to movement the greater the proportion of the loading it has, and vice versa, the quality or momentary accuracy of the method and the size of the difference between the conveyor belt segments 8 used is inferred from the comparison of the two sorting sequences and the difference between the respective f values for the greatest and smallest loading of each conveyor belt segment 8.

In the same way, for each installation section all the f values when this section assumed the uppermost place and the lowermost place in the sorting sequence are presented.

Furthermore, for each section, the mean values of the f values are determined respectively for the uppermost place and lowermost place of the section in the sorting series for this temperature class For each temperature class, the installation sections are sorted in accordance with these mean values.

Since a well maintained and aligned installation section 13 has all the greater benefit for the overall resistance to movement the greater the proportion of the loading it has, and vice versa, the quality or momentary accuracy of the method and the size of the difference between the individual sections is inferred from the comparison of the two sorting sequences and the difference between the respective f values for the greatest and smallest loading of each installation section.

An advantageous alternative refinement of the evaluation is that each conveyor belt segment and each installation section is ascribed the reference quality factor f belonging to each loading state with a weighting factor according to its loading at the particular time and these weighted f values are added together for each temperature class and possibly divided by the number of measured values. The sums or values thus determined for each conveyor belt segment and each installation section give their efficiency in comparison with all of the conveyor belt segments and installation sections very well.

LIST OF REFERENCE SYMBOLS

1 Belt conveyor or belt conveying installation
2 Conveyor belt, also referred to as belt
3 Material being conveyed, loading
4 Feeding region
5 Discharging or transferring region
6 Carrying roller
7 Drive
8 Conveyor belt segment
9 Connecting section of two conveyor belt segments
10 Control device
11 Third sensor system, connecting section sensor
12 Chute
13 Installation section or momentary belt section of the conveying belt installation
14 Belt weigher
15 Loading distribution over installation sections
16 Loading distribution over individual belt
17 Deflection roller
18 First sensor system (energy consumption)
20 Torque sensor
22 Speed sensor
24 Second sensor system (loading sensor)
25 Temperature sensor
30 Motor
32 Hydrodynamic clutch
34 Gear mechanism
f Reference quality factor in the belt conveyor
n Number of installation sections, number of measured values
LG Individual belt length
L Loading length of the circulating belt
ΔL Loading length of a time interval Δt
Δt Time interval of a conveyed amount sensed by a belt weigher
t1-t3 Different points in time during the conveyance
v Velocity of the belt

The invention claimed is:

1. A belt conveyor, comprising:
a control device;
a conveyor belt formed of a plurality of conveyor belt segments and connecting sections between said conveyor belt segments;
at least one drive for driving said conveyor belt;
at least one carrying roller;
a first sensor system for sensing the energy consumption of the drive and a second sensor system for sensing a loading associated with a section of said conveyor belt; and
a third sensor system for detecting connecting sections between the conveyor belt segments.

2. The belt conveyor according to claim 1, wherein said third sensor system comprises at least one sensor for sensing a compressive spring stiffness of said conveyor belt.

3. The belt conveyor according to claim 1, wherein said conveyor belt is a steel cable conveyor belt and said third sensor system is a coil or at least one magnetic field sensor for detecting said connecting sections by detection of an accumulation of steel in said connecting sections.

4. The belt conveyor claim 1, wherein said third sensor system is fixedly arranged and said conveyor belt and arranged to be driven with respect to said third sensor system by the drive.

5. The belt conveyor claim 1, wherein said first sensor system comprises a torque sensor, which is arranged in a drivetrain, for sensing an actual energy consumption of said drive.

6. The belt conveyor claim 1, wherein said torque sensor is provided in a hydrodynamic clutch arranged in the drivetrain.

7. A method of sensing an energy demand of a belt conveyor, the belt conveyor having at least one drive and a conveyor belt formed of conveyor belt segments, the method comprising:
sensing a load distribution of the conveyor belt;
calculating the energy demand of the drive while taking into consideration the load distribution of the conveyor belt;
sensing an energy consumption of the drive; and
applying a correlation function to the energy demand calculated in the calculating step to bring about an agreement of the calculated energy demand with the measured energy consumption.

8. The method according to claim 7, which comprises, for determining a variation over time of a position of a given conveyor belt segment, sensing connecting sections at least of the given conveyor belt segment to at least one neighboring conveyor belt segment.

9. The method according to claim 7, which comprises measuring a compressive spring stiffness of the conveyor belt and passing corresponding measurement signals to the control device, wherein a passing of the sensor system for measuring the compressive spring stiffness of a connecting section between conveyor belt segments is determined from a transient increase in a measured compressive spring stiffness.

10. The method according to claim 7, which comprises determining a sequence of connecting sections at at least one position, by measuring a coil current or measuring an excitation of a magnetic field sensor by the passing conveyor belt and passing corresponding measurement signals to the control device.

11. The method according to claim 7, which comprises determining the energy consumption of the drive by carrying out a torque measurement.

12. The method according to claim 7, which comprises determining a reference quality factor for a conveyor belt segment.

13. The method according to claim 7, which comprises determining a width-based resistance to movement of a given conveyor belt segment by way of an optimization method.

14. The method according to claim 13, which comprises determining a width-based resistance to movement $F'_G$ of the given conveyor belt segment according to $$F_G = a \cdot F'^b_O,$$

where $F'_O$ is a width-based load perpendicular to a carrying roller, and a coefficient a and an exponent b are parameters which depend on belt properties of the given conveyor belt segment.

15. The method according to claim 7, wherein the conveyor is divisible into installation sections and an evaluation of the measured values is performed on a basis of the installation sections.

16. The method according to claim 7, which comprises assigning the measured values to temperature classes and carrying out a determination or evaluation only within one temperature class.

* * * * *